(12) United States Patent
Hayashi et al.

(10) Patent No.: US 9,260,611 B2
(45) Date of Patent: Feb. 16, 2016

(54) SYNTHESIS METHOD FOR SELF-DISPERSIBLE PIGMENT, SELF-DISPERSIBLE PIGMENT, INK JET INK, INK CARTRIDGE, AND INK JET RECORDING METHOD

(75) Inventors: Katsuhiro Hayashi, Yokohama (JP); Junichi Sakai, Machida (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 13/286,615

(22) Filed: Nov. 1, 2011

(65) Prior Publication Data
US 2012/0147083 A1 Jun. 14, 2012

(30) Foreign Application Priority Data
Dec. 8, 2010 (JP) ................ 2010-274014

(51) Int. Cl.
- *B41J 2/01* (2006.01)
- *C09C 1/56* (2006.01)
- *B41J 2/21* (2006.01)
- *C09C 3/08* (2006.01)
- *C09D 11/322* (2014.01)
- *C09B 67/00* (2006.01)
- *C09B 56/04* (2006.01)
- *C09D 11/324* (2014.01)

(52) U.S. Cl.
CPC ............ *C09C 1/565* (2013.01); *B41J 2/2107* (2013.01); *C09B 56/04* (2013.01); *C09B 68/26* (2013.01); *C09B 68/4257* (2013.01); *C09B 68/443* (2013.01); *C09C 3/08* (2013.01); *C09D 11/322* (2013.01); *C09D 11/324* (2013.01); *B41J 2/01* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC .......... 347/100, 95, 96, 101, 102, 105, 21, 20, 347/9; 106/31.6, 31.13; 523/160, 161
See application file for complete search history.

(56) References Cited

U.S. PATENT DOCUMENTS

| | | | |
|---|---|---|---|
| 5,244,979 A * | 9/1993 | Yamamoto et al. | ........ 525/329.7 |
| 6,194,539 B1 | 2/2001 | Matsui | |
| 6,723,783 B2 | 4/2004 | Palumbo et al. | |
| 7,008,977 B2 | 3/2006 | Sakai et al. | |
| 7,291,211 B2 | 11/2007 | Kaneko et al. | |
| 7,297,202 B2 | 11/2007 | Ichinose et al. | |
| 7,377,631 B2 | 5/2008 | Takada et al. | |
| 7,378,459 B2 | 5/2008 | Nishiguchi | |
| 7,629,395 B2 | 12/2009 | Nishiguchi et al. | |
| 7,723,403 B2 | 5/2010 | Nishiwaki et al. | |
| 7,863,351 B2 | 1/2011 | Nishiwaki et al. | |
| 7,868,060 B2 | 1/2011 | Sakai et al. | |
| 7,893,152 B2 | 2/2011 | Palumbo et al. | |
| 7,909,449 B2 | 3/2011 | Sato et al. | |
| 7,922,805 B2 | 4/2011 | Kowalski et al. | |
| 7,973,097 B2 | 7/2011 | Nishiguchi et al. | |
| 7,977,409 B2 | 7/2011 | Nishiguchi et al. | |
| 8,011,777 B2 | 9/2011 | Yamashita et al. | |
| 8,147,608 B2 | 4/2012 | Sujeeth et al. | |
| 2004/0212667 A1 | 10/2004 | Nishiguchi | |
| 2004/0229975 A1 | 11/2004 | Palumbo et al. | |
| 2006/0169171 A1* | 8/2006 | Lee et al. | ................ 106/31.6 |
| 2006/0211791 A1 | 9/2006 | Burns et al. | |
| 2008/0146723 A1 | 6/2008 | Nishiwaki et al. | |
| 2010/0026743 A1* | 2/2010 | Van Thillo et al. | ........... 347/100 |
| 2010/0047455 A1* | 2/2010 | Hoogmartens | ............... 523/220 |
| 2010/0086686 A1 | 4/2010 | Nishiguchi et al. | |
| 2010/0086687 A1 | 4/2010 | Hayashi et al. | |
| 2010/0302300 A1* | 12/2010 | Verdonck | ..................... 347/100 |
| 2011/0001775 A1 | 1/2011 | Nishiwaki et al. | |
| 2011/0141190 A1 | 6/2011 | Moribe et al. | |
| 2011/0239903 A1 | 10/2011 | Sujeeth et al. | |

FOREIGN PATENT DOCUMENTS

| | | |
|---|---|---|
| DE | 69530555 T2 | 1/2004 |
| DE | 60122108 T2 | 3/2007 |
| EP | 0713894 B1 | 5/2003 |
| EP | 1252237 B1 | 8/2006 |
| EP | 1833932 A2 | 9/2007 |
| JP | 8-143813 A | 6/1996 |
| JP | 2003-519709 A | 6/2003 |
| JP | 2004-143272 A | 5/2004 |
| JP | 2004143272 A | 5/2004 |
| JP | 2008-524400 A | 7/2008 |

(Continued)

OTHER PUBLICATIONS

Office Action issued in Denmark Patent Office Application No. 102011120330.7, dated Jun. 25, 2012.
Office Action issued in German Patent Office Application No. 102011120330.7, dated Jun. 25, 2012.
Nov. 10, 2015 German Official Action in German Patent Appln. No. 10 2011 120 330.7.

*Primary Examiner* — Manish S Shah
(74) *Attorney, Agent, or Firm* — Fitzpatrick, Cella, Harper & Scinto

(57) ABSTRACT

Provided is a synthesis method for a self-dispersible pigment, including performing ring-opening addition of a lactone-based compound to an acidic group bonded to a surface of a pigment particle directly or via another atomic group to bond a functional group including an ester group to the surface of the pigment particle.

6 Claims, No Drawings

(56) References Cited

FOREIGN PATENT DOCUMENTS

| | | | |
|---|---|---|---|
| JP | 2008-531762 A | 8/2008 | |
| WO | 01/51566 A1 | 7/2001 | |
| WO | 2006/066132 A2 | 6/2006 | |
| WO | 2006/086660 A1 | 8/2006 | |

* cited by examiner

SYNTHESIS METHOD FOR SELF-DISPERSIBLE PIGMENT, SELF-DISPERSIBLE PIGMENT, INK JET INK, INK CARTRIDGE, AND INK JET RECORDING METHOD

BACKGROUND OF THE INVENTION

1. Field of the Invention

The present invention relates to a synthesis method for a self-dispersible pigment, a self-dispersible pigment, an ink jet ink, an ink cartridge, and an ink jet recording method.

2. Description of the Related Art

In general, a pigment alone is hardly dispersed in a dispersion medium. Thus, various studies have heretofore been made to obtain a stable pigment dispersion. For example, the dispersion stability of a pigment in various dispersion media has been enhanced by using a resin or a surfactant as a dispersant for dispersing the pigment. For example, Japanese Patent Application Laid-Open No. H08-143813 proposes a print ink using, as a pigment dispersant, a resin having a graft structure in which a polyester chain as a side chain is bonded to a main chain constructed of a polyamine. In addition, Japanese Patent Application Laid-Open No. 2008-524400 describes an attempt to enhance dispersibility of a pigment itself in a dispersion medium by bonding an ionic group to the surface of the pigment particles by a chemical treatment.

In recent years, an ink jet recording apparatus has been frequently used in an office or a home. Under such circumstances, demands for abrasion resistance of an image have been increased. In order to overcome this problem, various attempts have so far been made. For example, Japanese Patent Application Laid-Open No. 2004-143272 proposes a combination use of a self-dispersible pigment with an emulsion of a resin having a polyester structure as ink components.

Further, Japanese Patent Application Laid-Open Nos. 2003-519709 and 2008-531762 each propose modification of a pigment by chemically bonding a resin to the surface of a pigment particle in addition to covering the pigment with the resin to form a microencapsulated pigment.

SUMMARY OF THE INVENTION

However, as a result of intensive studies by the inventors of the present invention, it has been found that the related art technologies as described above have the following problems, respectively.

The dispersion of a pigment with a resin dispersant or surfactant and the modification of the surface of a pigment particle with an ionic group, which are described in Japanese Patent Application Laid-Open No. H08-143813 and Japanese Patent Application Laid-Open No. 2008-524400, respectively, are treatments for enhancing the affinity of the pigment to a dispersion medium that constructs an ink. Therefore, after the ink is applied to a recording medium, solid-liquid separation hardly occurs and the abrasion resistance of an image tends to be deteriorated. Besides, the resin dispersant described in Japanese Patent Application Laid-Open No. H08-143813 is hardly applicable to an aqueous ink.

Meanwhile, in order to improve the abrasion resistance of an image, a technique of adding a resin emulsion as a binder into an ink has been known. In this case, however, an increase in resin concentration causes an increase in viscosity of the ink while causing a decrease in stability of the ink. As a result, long-term ejection stability tends to be hardly obtained. For instance, in Japanese Patent Application Laid-Open No. 2004-143272, an ink contains a self-dispersible pigment and an emulsion of a resin having a polyester structure. However, the resin emulsion has been required to be added in a large amount in order to improve the abrasion resistance of an image because the resin is not adsorbed on or bonded to the pigment. Consequently, long-term ejection stability has been hardly obtained. Further, even if an attempt is made to improve the abrasion resistance of an image by adding a water-soluble resin, an ionic group or the like should be incorporated into the resin. Like the above-mentioned case of the pigment, solid-liquid separation hardly occurs after the ink is applied to a recording medium. Thus, the abrasion resistance of an image cannot be improved significantly.

That is, bonding a resin to the surface of a pigment particle is much desired for simultaneously attaining both the abrasion resistance of an image and the long-term ejection stability of an ink. For that purpose, for instance, Japanese Patent Application Laid-Open No. 2003-519709 describes a technique of binding a resin to a pigment by bonding a reactive group to the surface of a pigment particle and then subjecting the reactive group to a reaction with the resin. However, the pigment synthesized by this technique includes an unavoidable unreacted reactive group in each of the pigment and the resin. Thus, the pigments interact with one another even after synthesizing an ink, and the long-term dispersion stability of the pigment cannot be retained. Therefore, long-term ejection stability has not been able to be obtained.

Further, Japanese Patent Application Laid-Open No. 2008-531762 describes a technique of binding a resin to a pigment by extending a resin chain from the surface of a pigment particle by radical polymerization. However, in the pigment synthesized by this technique, the main chain of the bonded resin forms a hydrophobic chain of C—C bonds because the resin is extended by radical polymerization. Thus, the resin remains adsorbed on the surface of the pigment particles. Therefore, the dispersion stabilization of the pigment due to steric repulsion, which is one of the effects of the binding of the resin, is hardly obtained and the need of attaining the dispersion stability of the pigment by introducing many units derived from hydrophilic monomers into the resin. As a result, the above-mentioned technique has been prevented from improving the abrasion resistance of an image.

Therefore, an object of the present invention is to provide a self-dispersible pigment with which long-term ejection stability of an ink and excellent abrasion resistance of an image can be obtained, for example, when the pigment is used in an ink jet ink. Another object of the present invention is to provide a synthesis method for a self-dispersible pigment, with which such useful pigment can be obtained. Still another object of the present invention is to provide an ink jet ink, an ink cartridge, and an ink jet recording method each using the above-mentioned self-dispersible pigment.

The above-mentioned objects are achieved by the present invention described below. That is, the present invention provides a synthesis method for a self-dispersible pigment, including: performing ring-opening addition of a lactone-based compound to an acidic group bonded to the surface of a pigment particle directly or via another atomic group to bond a functional group including an ester group to the surface of the pigment particle. The present invention also provides a self-dispersible pigment, including: a pigment particle; and a functional group represented by the following general formula (1) bonded to the surface of the pigment particle, and an ink jet ink, including the self-dispersible pigment:

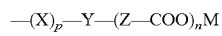

General formula (1)

in the above-mentioned general formula (1): X represents another atomic group; p represents a number of 0 or 1; Y represents an ester group; Z represents an alkylene group; n represents a number of 1 or more and 20 or less; M represents a hydrogen atom, an alkaline metal, ammonium, or an organic ammonium.

According to the present invention, the self-dispersible pigment in which a specific functional group including an ester group is bonded to the surface of a pigment particle can be provided. In addition, the synthesis method for the self-dispersible pigment can also be provided. Further, according to another aspect of the present invention, the ink jet ink excellent in abrasion resistance of an image and long-term ejection stability, the ink cartridge, and the ink jet recording method can be provided by using the above-mentioned self-dispersible pigment.

Further features of the present invention will become apparent from the following description of exemplary embodiments.

DESCRIPTION OF THE EMBODIMENTS

Hereinafter, the present invention is described more specifically with reference to preferred embodiments thereof.

The inventors of the present invention have intensively studied and, as a result, have obtained the following findings thereby completing the present invention. That is, ring-opening addition of a lactone-based compound to an acidic group (ionic group), which is bonded to the surface of a pigment particle directly or via another atomic group, is performed to bond a functional group including an ester group to the surface of pigment particles. It has been found that, when such pigment is used in an ink jet ink, the long-term ejection stability of an ink can be obtained and the abrasion resistance of an image can be improved because the functional group of the thus synthesized self-dispersible pigment has a good hydrophilicity/hydrophobicity balances.

Self-dispersible pigment and synthesis method therefor:

Hereinafter, a self-dispersible pigment in which a specific functional group including an ester group is bonded to the surface of a pigment particle and a synthesis method for the self-dispersible pigment according to the present invention are described.

Pigment in which acidic group is bonded to surface of pigment particle directly or via another atomic group:

In the synthesis method for a self-dispersible pigment according to the present invention (hereinafter, also simply referred to as "synthesis method of the present invention"), a pigment in which an acidic group is bonded to the surface of a pigment particle directly or via another atomic group is used as a raw material. Examples of the acidic group include a carboxy group, a sulfonic acid group, a phosphoric acid group, and a phosphoric acid group. Of those, a carboxy group is preferred in view of reactivity with a lactone-based compound.

The above-mentioned acidic group should be bonded to the surface of a pigment particle directly or via another atomic group. Examples of the another atomic group include an arylene group, an alkylene group having about 1 to 12 carbon atoms, an ether group, an ester group, an amide group, an amino group, a sulfonyl group, a carbonyl group, and a group formed of a combination of at least two of those groups.

In the present invention, examples of the pigment in which an acid group is directly bonded to the surface of a pigment particle may include the following commercially available acidic pigments: #2700, #2650, #2400, #2350, and #1000, MA7, MA77, MA8, MA11, MA100, MA100R, MA220, and MA230 (manufactured by Mitsubishi Chemical Corporation); Color Black FW1, FW2, FW2V, FW18, FW200, 5150, 5160, and S170 (manufactured by Degussa GmbH); Printex U, V, and 140U (manufactured by Degussa GmbH); and Special Black 6, 5, and 4 (manufactured by Degussa GmbH). Those acidic pigments are powdered and can be suitably used in the synthesis method of the present invention.

However, the pigment is not limited to those mentioned above. Alternatively, further examples of the pigment in which an acid group is directly bonded to the surface of a pigment particle via another atomic group may include the following commercially available self-dispersible pigments: Cab-O-Jet 200, 300, 400, 270Y, 470Y, 740Y, 554B, 480V, 352B, 260M, 265M, 465M, 250C, 450C, and 1027R (manufactured by Cabot Corporation); BONJET BLACK CW-1, CW-2, and M-800 (manufactured by Orient Chemical Industries Co., Ltd.); and Aqua-Black 001 and 162 (manufactured by Tokai Carbon Product Co, Ltd.). Some of those pigments are in the form of pigment-dispersed liquids in which self-dispersible pigments are dispersed in water and suitably applicable to the synthesis method of the present invention as in the case with the powered pigments.

Further, in the present invention, any pigment, such as one of the commercially available pigments as described above, may be subjected to an oxidation treatment and used. An oxidizing agent used in this case can be any of those typically used in the art, and preferably one having at least partial solubility in an aqueous medium. Specific example of the preferred oxidizing agent include: oxidizing gas, such as oxygen gas and ozone; peroxides such as hydrogen peroxide; persulfates, such as sodium persulfate and potassium persulfate; hypohalites, such as sodium hypochlorite; oxidizing acids, such as nitric acid; and transition-metal-containing oxidizing agents, such as a permanganate, osmium tetroxide, chrome oxide, and ammonium nitrate cerium. Of those, the use of a pigment subjected to an oxidation treatment with ozone is particularly preferred in the present invention.

A common reactor or vessel can be used for the oxidation treatment with the above-mentioned oxidizing agent. For instance, ozone may be generated by an ozone generator and bubbled into an aqueous medium in which a pigment is dispersed. By adjusting a bubbling time period, a desired amount of acidic groups may be bonded to the surface of a pigment particle directly or via another atomic group. Further, various reaction conditions, such as a reaction time, a reaction vessel size, and a reaction temperature, may be determined depending on the type of the oxidizing agent.

Further, various reaction conditions may be used for the above-mentioned oxidation treatment. In particular, the oxidation treatment may be preferably performed under conditions where a pigment is partially dispersed in an aqueous medium. For instance, an ultrasonic dispersion device, a high-pressure homogenizer, or Clearmix (manufactured by M Technique Co., Ltd.) may be used before or during the oxidation treatment.

In general, an acidic chemical species, in particular an acidic group, has been known to be generated when a pigment, in particular a carbon pigment (e.g., carbon black), is treated with an oxidizing agent. Therefore, the oxidation treatment is expected to cause a decrease in pH of a pigment-containing liquid. The decrease of pH may render the dispersion state of the pigment unstable in the oxidation treatment. Besides, an increase in viscosity of the pigment-containing liquid is expected to accompany the destabilization. Thus, it is preferred to adjust the pH. The pH adjustment may be performed before, during, or after the oxidation treatment. A water-soluble base can be used for the pH adjustment.

Examples of the water-soluble base used in this case include sodium hydroxide, potassium hydroxide, ammonia, and a water-soluble amine.

A pigment which is suitably used in the present invention and includes an acidic group bonded to the surface of a pigment particle directly or via another atomic group can be obtained by bonding a sufficient amount of the acidic group (or salt-form acidic group) to the surface of the pigment particle and then placing the pigment particle under acidic conditions.

The amount of the acidic group bonded to the surface of a pigment particle directly or via another atomic group can be calculated as follows. First, 2 g of a pigment (solid content) to be measured is added to 500 ml of an aqueous sodium bicarbonate solution (0.976 mol/L) and the mixture is stirred for 30 hours. Subsequently, a titration is performed using an aqueous potassium hydroxide solution (0.1 mol/L) to calculate the amount of the acidic group bonded to the surface of the pigment particle directly or via another atomic group.

Reaction of acidic group bonded to surface of pigment particle directly or via another atomic group with lactone-based compound:

In the synthesis method for a self-dispersible pigment of the present invention, ring-opening addition of a lactone-based compound to an acidic group which is bonded to the surface of a pigment particle directly or via another atomic group is performed to bond a functional group including an ester group to the surface of the pigment particle. In a more preferred embodiment of the present invention, the above-mentioned ring-opening addition is followed by ring-opening polymerization of the lactone-based compound. Here, the ester group formation by the ring-opening addition of the lactone-based compound to the acid group and the ring-opening polymerization of the lactone-based compound are generally performed through a series of reactions. In other words, when an ester group is formed by ring-opening addition of the lactone-based compound to the acidic group bonded to the surface of a pigment particle directly or via another atomic group, the ring-opening of the lactone-based compound newly forms a carboxy group at the end opposite to the pigment. Here, ring-opening polymerization of the lactone-based compound is further performed on the newly generated carboxy group when the lactone-based compound is present in an amount enough to serve as a reaction component. Thus, a functional group which is formed on the surface of the pigment particle by ring-opening addition of the lactone-based compound and the repetition thereof, i.e., ring-opening polymerization, always has a carboxy group at the end opposite to the pigment.

As described above, the functional group formed by the synthesis method including ring-opening of the lactone-based compound has an ester group derived from the lactone-based compound with appropriate hydrophilicity in its structure. Thus, even if the functional group is bonded to the surface of a pigment particle, it is hardly adsorbed on the surface of the pigment particle. Therefore, when the pigment is used as a coloring material of an ink jet aqueous ink, the functional groups can spread in an aqueous medium. As a result, steric repulsion can be imparted to the pigment, and hence the dispersion stability of the pigment can be increased and an ink jet ink using such pigment attains long-term ejection stability. Further, as steric repulsion can be imparted to the pigment, the amount of a hydrophilic group can be reduced. Thus, solid-liquid separation easily occurs in a recording medium when the pigment is used in an ink, and the abrasion resistance of an image on the recording medium can be expected to be improved.

Further, in general, a structure obtained by ring-opening of a lactone-based compound is hardly broken with cracks, and hence is categorized as one having large breaking elongation. In the present invention, a functional group including the structure having such feature is chemically bonded to a pigment. Thus, when a printed article including an image is formed, the pigment is hardly broken even by applying physical force to the printed article. As a result, the image can have excellent abrasion resistance.

The amount of the lactone-based compound to be used with respect to the amount of the acidic group bonded to the surface of a pigment particle directly or via another atomic group is determined depending on the molecular weight of the target functional group. For instance, in a case where the amount of the acidic group bonded to the surface of the pigment particle directly or via another atomic group, as calculated in the foregoing, is 200 μmol/g, the amount of the lactone-based compound to be used is determined as follows. That is, 4.0 mol of lactone is added per mole of the acidic group on the average when 91.2 g (0.8 mol) of ε-caprolactone per gram of pigment is subjected to the reaction. In other words, a pigment in which a functional group where the average number of repetitions n of the lactone-based compound used in the reaction is 4.0 is bonded to the acidic group can be obtained.

Thus, the functional group bonded to the surface of the pigment particle has a structure represented by the following general formula (1).

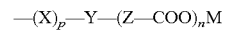   General formula (1)

(In the above-mentioned general formula (1): X represents another atomic group; p represents a number of 0 or 1; Y represents an ester group; Z represents an alkylene group; n represents a number of 1 or more and 20 or less; M represents a hydrogen atom, an alkali metal, ammonium, or an organic ammonium.)

More specifically, X represents another atomic group which may be bonded to the surface of the pigment particle. Specific examples of the another group include an arylene group, an alkylene group having 1 to 12 carbon atom(s), an ether group, an ester group, an amide group, an amino group, a sulfonyl group, a carbonyl group, and a group formed of a combination of at least two of those groups. It should be noted that the another group does not exist when p represents 0, meaning that —Y—(Z—COO)$_n$M is bonded as the functional group to the surface of the pigment particle.

Y represents an ester group formed by ring-opening addition of the lactone-based compound to the acidic group bonded to the surface of the pigment particle directly or via another atomic group. The ester group used herein means an ester group in the broad sense of the term and is determined by the type of the acidic group bonded to the surface of the pigment particle directly or via another atomic group. Specific examples of the ester group include a carboxylic acid ester group, a sulfonic acid ester group, a phosphoric acid ester group, and a phosphoric acid ester group.

Z represents an alkylene group determined by the lactone-based compound to be used in the reaction, and may be linear or branched. Specifically, Z represents $C_mH_{2m}$ where m represents preferably 2 or more and 5 or less, more preferably 5. Thus, examples of the lactone-based compound to be used in the synthesis method of the present invention preferably include β-propiolactone, γ-butyrolactone, δ-valerolactone, ε-caprolactone, and a compound having any one of these lactone structures in the molecule thereof. In particular, it is preferred to use any of β-propiolactone, δ-valerolactone, and ε-caprolactone because any of these compounds is highly reactive, prevents contamination with impurities when used as an ink component, and imparts satisfactory long-term ejection stability to the ink. Further, ε-caprolactone is more preferred in that it has a moderate balance between hydrophilicity and hydrophobicity and further excels in long-term ejection stability of the ink. When a functional group formed by any of those lactone-based compounds and the acidic group bonded to the surface of a pigment particle directly or via another atomic group is represented by the above-mentioned general formula (1), Z in the functional group, or m of $C_mH_{2m}$, is determined as follows: m=2 for β-propiolactone, m=3 for γ-butyrolactone, m=4 for δ-valerolactone, and m=5 for ε-caprolactone.

n represents the average number of repetitions of the lactone-based compound added per acid group bonded to the surface of the pigment particle directly or via another atomic group, and preferably represents a number of 1 or more and 20 or less. If n is less than 1, a sufficient effect for the abrasion resistance of an image may not be attained due to a shortage of a binder component when the pigment is used in the ink. In contrast, if n exceeds 20, the viscosity of the ink increases due to interactions among the functional groups bonded to the surface of the pigment particles. In some cases, therefore, sufficient ejection stability may not be attained. It should be noted that n represents an average value, and hence may represent an integer or a decimal number.

Further, it is preferred to use a catalyst in ring-opening addition of a lactone-based compound to an acidic group bonded to the surface of a pigment particle directly or via another atomic group as well as in ring-opening polymerization of the lactone-based compound. Examples of the catalyst, which can be used, include aluminum chloride, stannic chloride, sulfuric acid, p-toluenesulfonic acid, benzenesulfonic acid, and a sulfonic acid type ion-exchange resin. It should be noted that any of those catalysts may be also used in the form of a salt, an anhydride, a hydrate, or the like. Sulfuric acid or p-toluenesulfonic acid may be preferred from the viewpoint of solubility in a reaction solvent. Further, the reaction solvent may be any solvent that does not inhibit the above-mentioned reaction, and examples thereof include acetone, methyl ethyl ketone, methyl isobutyl ketone, benzene, toluene, and xylene.

The average number of repetitions of a lactone-based compound ("n" described previously) added per acidic group can be calculated as follows. First, the reaction rate of the lactone-based compound used in the reaction is calculated from a result of liquid-phase chromatography (gas chromatography or liquid chromatography). The resulting reaction amount of the lactone-based compound is divided by the amount of an acidic group bonded to the surface of a pigment particle directly or via another atomic group to calculate the average number of repetitions n of the lactone-based compound added per acidic group.

The facts that an acidic group bonded to the surface of a pigment particle directly or via another atomic group is changed into an ester group through ring-opening addition of a lactone-based compound and that the structure derived from the lactone-based compound is included in a functional group can be confirmed as follows. A dispersion liquid containing the obtained self-dispersible pigment is centrifuged at 30,000 rpm for 8 hours in an ultracentrifuge to separate the dispersion liquid into a supernatant liquid and a precipitation. Then, these fractions are individually dried under vacuum, and the nonvolatile matter obtained from the supernatant is then dissolved in tetrahydrofuran (hereinafter, abbreviated as THF). Subsequently, the presence or absence of any component, such as a resin, which is not bonded to the pigment can be confirmed by analyzing the solution with gel permeation chromatography (GPC) in terms of polystyrene using THF as an eluent. In addition, the nonvolatile matter obtained from the precipitate is analyzed by thermogravimetry (TG) to confirm the presence of a functional group component and a pigment component in the same phase. In this case, the mass ratio between the functional group portion and the pigment can also be calculated. As described above, the amount of the acidic group bonded to the surface of the pigment particle directly or via another atomic group is measurable, and hence such measurement can find the average number of repetitions of the lactone-based compound bonded per acidic group.

The pigment with the bonded functional group obtained through the above-mentioned reaction can be easily dispersed in an aqueous medium by neutralizing the carboxy group that is present at the end of the functional group opposite to the pigment with a base. Specifically, M in the general formula (1) described above may represent a hydrogen atom but preferably represents an alkali metal, ammonium, or an organic ammonium. In particular, the base used for neutralization is preferably one or more kinds of sodium hydroxide, potassium hydroxide, and ammonia from the viewpoint of the solubility in water.

The self-dispersible pigment according to the present invention may be dispersed by using any of common dispersion machines, such as an ultrasonic dispersion device, a high-pressure homogenizer, a batch-type stirring machine (e.g., trade name: Clearmix, manufactured by M Technique Co., Ltd.), a bead mill, and a nanomizer.

Ink

The self-dispersible pigment according to the present invention described above is suitable as a coloring material of an ink jet ink. Hereinafter, each component of the ink jet ink of the present invention is described.

Coloring Material

The ink of the present invention contains, as a coloring material, a self-dispersible pigment synthesized by the synthesis method of the present invention as described above. By using such self-dispersible pigment, any dispersant such as a resin for dispersing a pigment into an ink is not required or the amount of the dispersant to be added can be reduced. The content (% by mass) of the self-dispersible pigment in the ink is preferably 0.1% by mass or more and 10.0% by mass or less with respect to the total mass of the ink. The ink of the present invention may further contain any of other coloring materials such as dyes and pigments, in addition to the self-dispersible pigment. Further, the self-dispersible pigment may be used in combination with another pigment subjected to another dispersion system or another kind of self-dispersible pigment.

The ink of the present invention is preferably an aqueous ink in which the self-dispersible pigment is dispersed in an aqueous medium. Examples of the aqueous medium include water and a mixed medium of water and a water-soluble organic solvent. The water is preferably deionized water. Further, as the water-soluble organic solvent there may be used any of solvents that may be used in ink jet inks, such as alcohols, glycols, glycol ethers, and nitrogen-containing compounds, and one or more kinds thereof may be incorporated in the ink. The content (% by mass) of water in the ink is preferably 50.0% by mass or more and 95.0% by mass or less with respect to the total mass of the ink. In addition, the content (% by mass) of the water-soluble organic solvent in the ink is preferably 3.0% by mass or more and 50.0% by mass or less with respect to the total mass of the ink.

Other Components

In addition to the above-mentioned components, the ink of the present invention may further contain urea or a sugar, or a derivative thereof, or a water-soluble organic compound in solid state at normal temperature, such as trimethylolpropane or trimethylolethane. In addition, the ink of the present invention may further contain, as necessary, any of various additives, such as a surfactant, a resin, a pH adjuster, an antifoaming agent, a rust inhibitor, an antiseptic agent, an antifungal agent, an antioxidant, a reduction inhibitor, and a chelating gent. Specifically, the resin to be used may be preferably a water-soluble resin, a water-dispersible resin, or a resin emulsion to enhance binder performance.

Ink Cartridge

An ink cartridge of the present invention includes an ink and an ink storage portion for storing the ink. In addition, the ink stored in the ink storage portion is the ink of the present invention as described above. In an exemplary structure of the ink cartridge, the ink storage portion includes a negative-pressure generating member, a chamber for housing the negative-pressure generating member, and an ink storing chamber. The negative-pressure generating member retains the ink while being impregnated therewith under negative pressure. The ink storage chamber stores the ink without being impregnated with the ink by the negative-pressure generating member. Alternatively, the ink storage portion may be structured without any ink storage chamber, such as one as described above. In this case, the ink is retained while the negative-pressure generating member is impregnated with the entire amount of the ink. Alternatively, further, the ink storage portion may be structured without any negative-pressure generating member. In this case, the ink is stored while the negative-pressure generating member is impregnated with the entire amount of the ink. Further, the ink cartridge may be structured to include an ink storage portion and a recording head.

Ink Jet Recording Method

The ink jet recording method of the present invention is a method of recording an image on a recording medium by ejecting the ink of the present invention described above from a recording head of an ink jet system. An exemplary system for ejecting the ink is one that imparts mechanical energy to the ink or one that imparts thermal energy to the ink. In particular, an ink jet recording method using thermal energy is preferably employed in the present invention. In addition to the use of the ink of the present invention, the ink jet recording method may include other steps that are known in the art.

EXAMPLES

Hereinafter, the present invention is described more specifically by way of Examples and Comparative Examples. The present invention is by no means limited to the following examples without departing from the gist of the present invention. It should be noted that the terms "part(s)" and "%" in the following description of synthesis of self-dispersible pigments and preparation of inks are on the mass basis unless otherwise stated.

Synthesis of Self-Dispersible Pigment

Examples 1 to 13 are synthesis examples of the synthesis method according to the present invention, each provided for obtaining a self-dispersible pigment in which a functional group including an ester group is bonded to the surface of a pigment particle. An appropriate amount of water was added to the synthesized self-dispersible pigment (hereinafter, also simply referred to as pigment) to give an aqueous dispersion having a pigment (solid) content of 20.0%.

Example 1

First, 500 g of Cab-O-Jet 300 (manufactured by Cabot Corporation) was added to a flask equipped with a stirrer and a pH meter, and then adjusted to pH 2.0 by dropwise addition of 1 mol/L hydrochloric acid while being stirred. Here, Cab-O-Jet 300 is a pigment dispersion containing carbon black in which a —COONa group is bonded to the surface of a pigment particle via a phenylene group ($—C_6H_4—$) and the content of the pigment (solid content) is 15.0%. After continuously stirring for 1 hour, the resulting pigment dispersion was centrifuged and the precipitate was then collected. The resulting precipitate was subjected to two cycles of washing with water and centrifugation. Then, impurities were removed, followed by powderization under vacuum drying. The amount of a carboxy group bonded to the surface of particles of the resulting powdered pigment was confirmed by titration as described below. Two grams of the powdered pigment was added to 500 ml of an aqueous sodium bicarbonate solution (0.976 mol/L) and the mixture was stirred for 30 hours. Subsequently, the powdered pigment was titrated using an aqueous potassium hydroxide solution (0.1 mol/L) to confirm that the amount of an acidic group (carboxy group) attached to the surface of particles of the powdered pigment was 250 µmol/g.

Next, the powdered pigment obtained in the foregoing was subjecting to an ultrasonic dispersion treatment, and 50 g thereof (equivalent of a carboxy group content of 12.5 mmol) and 200 g of acetone were placed in a flask equipped with a stirrer, a reflux condenser, a dropping funnel, and a nitrogen gas injection tube, thereby obtaining a mixed solution. Then, 0.6 g of p-toluenesulfonic acid (used as monohydrate) was added to the mixed solution and warmed up to 56° C. while being stirred. After that, 6.0 g of ε-caprolactone (52.6 mmol) was added dropwise from the dropping funnel over 1 hour while the temperature of the inside of the flask was kept at 56° C. Subsequently, the mixture was further stirred for additional 2 hours at 56° C. to carry out ring-opening addition of ε-caprolactone to a carboxy group bonded to the surface of a pigment particle via a phenylene group and ring-opening polymerization of unreacted ε-caprolactone. The amount of unreacted ε-caprolactone was measured by gas chromatography. Then, the reaction was terminated when 95% of ε-caprolactone was reacted. The resulting pigment in acetone dispersion liquid was cooled to room temperature and then centrifuged. The resulting precipitate was subjected to two cycles of dispersion into acetone and centrifugation to remove unreacted ε-caprolactone and p-toluenesulfonic acid, thereby obtaining a pigment 1. A functional group was bonded to the pigment 1. The functional group included a structure (polyester chain) in which 4.0 mol of ε-caprolactone was added per mole of carboxy groups on the average as acidic groups bonded to the surface of a pigment particle before the reaction via phenylene groups. In other words, when the functional group of the pigment 1 is represented by the general formula (1), X represents a phenylene group, p represents 1, Y represents a carboxylic acid ester group, Z represents $C_5H_{10}$, m represents 5, n represents 4.0, and M represents H.

Example 2

An appropriate amount of acetone was added to the total amount of the pigment 1 obtained in Example 1, followed by addition of an aqueous solution containing potassium hydroxide enough to neutralize an equivalent amount of 90% (neutralization rate of 90%) of a carboxy group in a functional group bonded to the surface of a pigment particle while being subjected to a ultrasonic dispersion treatment. In this case, 200 g of an aqueous potassium hydroxide solution in which 0.63 g (11.2 mmol) of potassium hydroxide was dissolved was used. After continuously performing the ultrasonic dispersion treatment for additional 30 minutes, acetone was removed under reduced pressure, thereby obtaining an aqueous dispersion of a pigment 2. The pigment 2 is obtained by neutralizing the pigment 1 synthesized in Example 1 described above. In the pigment 2, the functional groups include one in which M in the general formula (1) represents H and one in which M in the general formula (1) represents K.

Examples 3 to 6

In Examples 3 to 6, aqueous dispersions of pigments 3 to 6 with different average numbers of repetitions (n) of functional groups each represented by the general formula (1) in the pigment 2 obtained in Example 2. The aqueous dispersions of the pigments 3 to 6 were each obtained in a manner similar to the synthesis method of Example 1 and the neutralization method of Example 2 (neutralization rate of 90%), except that the amounts of ε-caprolactone and p-toluenesulfonic acid, which were used in Example 1, were changed as shown in Table 1. It should be noted that the pigment 3 obtained in Example 3 contains a pigment of n<1 as well as a pigment of n=1, where the average value of n is determined as 0.7. Similarly, the pigment 6 obtained in Example 6 contains a pigment of n>20 as well as a pigment of n=20, where the average value of n is determined as 21.0. Synthesis conditions and characteristics of the respective pigments are listed in Table 1.

TABLE 1

Synthetic conditions and characteristics of pigments 1 to 6

| | Example | | | | | |
|---|---|---|---|---|---|---|
| | 1 | 2 | 3 | 4 | 5 | 6 |
| | Pigment No. | | | | | |
| | 1 | 2 | 3 | 4 | 5 | 6 |
| Amount of ε-caprolactone (m = 5) [g] | 6.0 | 6.0 | 1.0 | 1.5 | 35.0 | 40.0 |
| Amount of p-toluenesulfonic acid [g] | 0.60 | 0.60 | 0.10 | 0.15 | 3.50 | 4.00 |
| Amount of potassium hydroxide [g] | — | 0.63 | 0.63 | 0.63 | 0.63 | 0.63 |
| Reaction rate of lactone-based compound [%] | 95 | 95 | 99 | 98 | 80 | 75 |
| Value of n | 4.0 | 4.0 | 0.7 | 1.0 | 19.6 | 21.0 |
| Type of M | H | H, K | H, K | H, K | H, K | H, K |

Examples 7 and 8

In Example 7, a pigment 7 having a functional group represented by the general formula (1) with different Z (value of m of $C_mH_{2m}$) was synthesized using δ-valerolactone (m=4) instead of ε-caprolactone (m=5), which was used in Example 1. Here, an aqueous dispersion of the pigment 7 was obtained in a manner similar to the synthesis method of Example 1 and the neutralization method of Example 2 (neutralization rate of 90%), except that the amount of the lactone-based compound to be added and the amount of p-toluenesulfonic acid to be used were changed so that n was substantially equal to that of the pigment 1 obtained in Example 1. Similarly, in Example 8, an aqueous dispersion of a pigment 8 was obtained using β-propiolactone (m=2). Synthesis conditions and characteristics of the respective pigments are listed in Table 2.

TABLE 2

Synthetic conditions and characteristics of pigments 7 and 8

| | Example | | |
|---|---|---|---|
| | 2 | 7 | 8 |
| Pigment No. | 2 | 7 | 8 |
| Amount of ε-caprolactone (m = 5) [g] | 6.0 | | |
| Amount of δ-valerolactone (m = 4) [g] | | 5.0 | |
| Amount of β-propiolactone (m = 2) [g] | | | 7.0 |
| Amount of p-toluenesulfonic acid [g] | 0.60 | 0.50 | 0.70 |
| Reaction rate of lactone-based compound [%] | 95 | 98 | 60 |
| Value of n | 4.0 | 3.9 | 4.7 |
| Type of M | H, K | H, K | H, K |

Examples 9 to 11

In Examples 9 to 11, pigments were synthesized by changing the type of the pigment used in Example 1 to another one. Pigments used were Special Black 4, Printex (both manufactured by Degussa GmbH), and Hansa Brilliant Yellow 5GX (manufactured by Clariant Corporation), respectively. Special Black 4, in which a carboxy group (i.e., an acidic group) was bonded to the surface of a pigment particle, was used without modification. Further, Printex 90 and Hansa Brilliant Yellow 5GX used were those each having a carboxy group as an acidic group bonded to the surface of a pigment particle by subjecting them to an ozone oxidation treatment. The ozone oxidation treatment was performed as follows. 60.0 g of each pigment was added to 340.0 g of ion exchange water and subjected to an ultrasonic dispersion treatment. Then, the resulting dispersion treated liquids were respectively used for synthesis of ozone oxidation treated pigments according to Example 1 of Japanese Patent Application Laid-Open No. 2008-524400, thereby obtaining dispersions of the respective pigments each with a pigment content (solid content) of 15.0%. Aqueous dispersions of pigments 9 to 11 were obtained in a manner similar to the synthesis method of Example 1 and the neutralization method of Example 2 (neutralization rate of 90%), except that the respective obtained pigment dispersions were used instead of Cab-O-Jet 300 of Example 1. Synthesis conditions and characteristics of the respective pigments are listed in Table 3. It should be noted that, in Table 3, the term "amount of acidic group" means the amount of an acidic group bonded to the surface of a pigment particle directly or via another atomic group.

TABLE 3

Synthetic conditions and characteristics of pigments 9 to 11

| | Example | | | |
|---|---|---|---|---|
| | 2 | 9 | 10 | 11 |
| Pigment No. | 2 | 9 | 10 | 11 |
| Amount of CAB-O-JET 300 [g] | 50 | | | |
| Amount of Special Black 4 [g] | | 50 | | |
| Amount of ozone oxidized Printex 90 [g] | | | 50 | |
| Amount of ozone oxidized Hansa Brilliant Yellow 5GX [g] | | | | 50 |
| Amount of acidic group [μmol/g] | 250 | 490 | 300 | 400 |
| Amount of ε-caprolactone (m = 5) [g] | 6.0 | 10.0 | 8.0 | 10.0 |
| Amount of p-toluenesulfonic acid [g] | 0.60 | 1.00 | 0.80 | 1.00 |
| Amount of potassium hydroxide [g] | 0.63 | 1.24 | 0.76 | 1.01 |

TABLE 3-continued

Synthetic conditions and characteristics of pigments 9 to 11

|  | Example | | | |
|---|---|---|---|---|
|  | 2 | 9 | 10 | 11 |
| Reaction rate of lactone-based compound [%] | 95 | 87 | 90 | 90 |
| Value of n | 4.0 | 3.1 | 4.2 | 3.9 |
| Type of M | H, K | H, K | H, K | H, K |

Examples 12 and 13

Aqueous dispersions of pigments 12 and 13 having functional groups each represented by the general formula (1) with different M were each obtained in a manner similar to Example 2, except that sodium hydroxide or 48% ammonia water was used instead of potassium hydroxide used in the neutralization method of Example 2. The amount of sodium hydroxide or 48% ammonia water used was set so that a neutralization rate of 90% was obtained as in the case with Example 2. In this case, the pigment 12 includes a functional group represented by the general formula (1) with M=H and that with M=Na, and the pigment 13 includes a functional group represented by the general formula (1) with M=H and that with M=NH$_4$. Synthesis conditions and characteristics of the respective pigments are listed in Table 4.

TABLE 4

Synthetic conditions and characteristics of pigments 12 and 13

|  | Example | | |
|---|---|---|---|
|  | 2 | 12 | 13 |
| Pigment No. | 2 | 12 | 13 |
| Amount of potassium hydroxide [g] | 0.63 |  |  |
| Amount of sodium hydroxide [g] |  | 0.45 |  |
| Amount of 48% ammonia water [g] |  |  | 0.40 |
| Reaction rate of lactone-based compound [%] | 95 | 95 | 95 |
| Value of n | 4.0 | 4.0 | 4.0 |
| Type of M | H, K | H, Na | H, NH$_4$ |

Comparative Example 1

In this comparative example, a pigment in which a functional group including a polyester chain was bonded by a different technique from the present invention was synthesized using a lactone-based compound. Specifically, in advance, the polyester chain was elongated by ring-opening polymerization of the lactone-based compound. Then, the resulting polyester chain was subjected to a reaction with an acidic group bonded to the surface of a pigment particle. First, a polyester resin 1 was synthesized as follows. To a flask equipped with a stirrer, a reflux condenser, a dropping funnel, and a nitrogen gas injection tube were added 8 g of glycolic acid (105 mmol), 500 g of acetone, and 0.5 g of p-toluenesulfonic acid monohydrate and the mixture was warmed up to 56° C. while being stirred. Then, 60 g of ϵ-caprolactone (526 mmol) was added dropwise from the dropping funnel over 1 hour while the temperature of the inside of the flask was kept at 56° C. After completing the dropwise addition, the stirring was continued for additional 2 hours at the same temperature. After the reaction, the amount of unreacted ϵ-caprolactone was measured by gas chromatography. As a result, it was confirmed that 97% of ϵ-caprolactone was reacted. In other words, an acetone solution of the polyester resin 1 to which 4.9 mol of ϵ-caprolactone was added per mole of glycolic acid on the average by ring-opening addition was obtained. The obtained polyester resin 1 had a hydroxyl group at one end of the resin and a carboxy group at the other end thereof.

Next, the following treatment was attempted with reference to the reaction between carbon black bonded to p-aminobenzoic acid and poly(vinyl alcohol), which was described in Example 10 of Japanese Patent Application Laid-Open No. 2003-519709. Specifically, the reaction described in Example 10 of this document was performed, except that the polyester resin 1 obtained as described above was used instead of poly (vinyl alcohol) to cause a reaction for bonding a carboxy group of the polyester resin 1 to p-aminobenzoic acid bonded to the surface of a pigment particle. A thermogravimetric measurement (TG) was performed on the pigment after the reaction. As a result, no volatile matter derived from the resin was found. This fact indicates that the polyester resin 1 did not react with the carbon block bonded to p-aminobenzoic acid.

Preparation of Ink

Inks of Examples 14 to 25 and Comparative Examples 2 to 6 were prepared as described below. It should be noted that Acetylenol E100 is a nonionic surfactant manufactured by Kawaken Fine Chemicals Co., Ltd. and polyethylene glycol used is one having an average molecular weight of 1,000.

Examples 14 to 25

Aqueous dispersions including the respective pigments (pigment content: 20.0%) synthesized as described above were used and mixed with components listed in Table 5 below to prepare inks of the respective examples. The contents of the pigments in the prepared inks were each 5.0%.

TABLE 5

Ink compositions of Examples 14 to 25 (unit: part(s))

|  | Example | | | | | | | | | | | |
|---|---|---|---|---|---|---|---|---|---|---|---|---|
|  | 14 | 15 | 16 | 17 | 18 | 19 | 20 | 21 | 22 | 23 | 24 | 25 |
|  | Pigment number | | | | | | | | | | | |
|  | 2 | 3 | 4 | 5 | 6 | 7 | 8 | 9 | 10 | 11 | 12 | 13 |
| Aqueous dispersion of pigment | 25.0 | 25.0 | 25.0 | 25.0 | 25.0 | 25.0 | 25.0 | 25.0 | 25.0 | 25.0 | 25.0 | 25.0 |
| 2-Pyrrolidone | 10.0 | 10.0 | 10.0 | 10.0 | 10.0 | 10.0 | 10.0 | 10.0 | 10.0 | 10.0 | 10.0 | 10.0 |
| Glycerin | 10.0 | 10.0 | 10.0 | 10.0 | 10.0 | 10.0 | 10.0 | 10.0 | 10.0 | 10.0 | 10.0 | 10.0 |
| Ethylene glycol | 5.0 | 5.0 | 5.0 | 5.0 | 5.0 | 5.0 | 5.0 | 5.0 | 5.0 | 5.0 | 5.0 | 5.0 |
| Polyethylene glycol | 5.0 | 5.0 | 5.0 | 5.0 | 5.0 | 5.0 | 5.0 | 5.0 | 5.0 | 5.0 | 5.0 | 5.0 |
| Acetylenol E100 | 0.5 | 0.5 | 0.5 | 0.5 | 0.5 | 0.5 | 0.5 | 0.5 | 0.5 | 0.5 | 0.5 | 0.5 |
| Ion exchange water | 44.5 | 44.5 | 44.5 | 44.5 | 44.5 | 44.5 | 44.5 | 44.5 | 44.5 | 44.5 | 44.5 | 44.5 |

Comparative Example 2

An ink of Comparative Example 2 was prepared by mixing components described below. The ink was prepared using a self-dispersible pigment bonded to only an acidic group (carboxy group) via a phenylene group without a functional group including a polyester chain. It should be noted that the content of the pigment in the prepared ink was 5.0%.

| | |
|---|---|
| Cab-O-Jet 300 | 33.3 parts |
| 2-Pyrrolidone | 10.0 parts |
| Glycerin | 10.0 parts |
| Ethylene glycol | 5.0 parts |
| Polyethylene glycol | 5.0 parts |
| Acetylenol E100 | 0.5 part |
| Ion exchange water | 36.2 parts |

Comparative Example 3

An ink of Comparative Example 3 was prepared by mixing components described below. The ink contained a self-dispersible pigment and a polyester resin not attached to the pigment. Here, the self-dispersible pigment was not bonded to a functional group including a polyester chain but only bonded to an acidic group (carboxy group) via a phenylene group. The polyester resin was equivalent to one contained in the functional group of the pigment of Example 2. The polyester resin 1 used was one synthesized in Comparative Example 1 in advance. In this case, the total amount (solid content) of the pigment in Cab-O-Jet 300 and the polyester resin 1 and the ratio between them were set to be substantially equal to the total amount of the pigment particle component and the polyester chain component contained in the functional group and the ratio between them in the pigment of Example 2. In other words, 29.7 parts of Cab-O-Jet 300 (equivalent to 4.5 parts of the pigment) with a pigment content (solid content) of 15.0% and 0.5 part of the polyester resin 1 (solid content) were used to give a total amount (solid content) of 5.0 parts. However, even when these components were mixed, an evaluation to be described later was not able to be performed because the polyester resin 1 was not dissolved in an aqueous medium.

| | |
|---|---|
| Cab-O-Jet 300 | 29.7 parts |
| Polyester resin 1 | 0.5 part |
| 2-Pyrrolidone | 10.0 parts |
| Glycerin | 10.0 parts |
| Ethylene glycol | 5.0 parts |
| Polyethylene glycol | 5.0 parts |
| Acetylenol E100 | 0.5 part |
| Ion exchange water | 39.3 parts |

Comparative Example 4

An ink of Comparative Example 4 was prepared by mixing components described below. The ink contained a self-dispersible pigment A and a polyester resin in an emulsion state. Here, the self-dispersible pigment was not bonded to a functional group including a polyester chain but bonded to an acidic group (sulfonic acid group) via a phenylene group. The self-dispersible pigment A and the resin emulsion F having a polyester structure, which were described in Example 1 of Japanese Patent Application Laid-Open No. 2004-143272, were used. It should be noted that, as in the case with Comparative Example 3, the total amount (solid content) of the pigment in the self-dispersible pigment A (Cab-O-Jet 200) and the polyester resin in the resin emulsion F and the ratio between them were set to be substantially equal to the total amount of the pigment particle component and the polyester chain component contained in the functional group and the ratio between them in the pigment of Example 2. In other words, 29.7 parts of a dispersion of the self-dispersible pigment A (equivalent to 4.5 parts of the pigment) and 2.1 parts of the resin emulsion F (equivalent to 0.5 part of the polyester resin) were used to give a total amount of 5.0 parts (solid content).

| | |
|---|---|
| Dispersion of self-dispersible pigment A | 29.7 parts |
| Resin emulsion F | 2.1 parts |
| 2-Pyrrolidone | 10.0 parts |
| Glycerin | 10.0 parts |
| Ethylene glycol | 5.0 parts |
| Polyethylene glycol | 5.0 parts |
| Acetylenol E100 | 0.5 part |
| Ion exchange water | 37.7 parts |

Comparative Example 5

An ink of Comparative Example 5 was prepared by mixing the same components as those of Example 14, except that a pigment dispersion obtained as described below was used as the pigment dispersion. The ink contained a self-dispersible pigment bonded to an acrylic resin, in which the resin was extended from the surface of a pigment particle by living polymerization. The ink was prepared according to Example 11 of Japanese Patent Application Laid-Open No. 2008-531762. Specifically, the carbon black bonded to the dealkylated resin of a block copolymer of n-butyl acrylate and t-butyl acrylate, which was described in Example 11 of the document, was neutralized by potassium hydroxide to adjust the solid content to 20.0%, thereby obtaining a pigment dispersion. Then, an ink of Comparative Example 5 was prepared in a manner similar to that of Example 14, except that the pigment dispersion obtained as described above was used instead of the aqueous dispersion of the pigment 2 used in the ink of Example 14.

Comparative Example 6

An ink of Comparative Example 6 was prepared by mixing the same components as those of Example 14, except that a pigment dispersion obtained as described below was used as the pigment dispersion. The ink contained a self-dispersible pigment in which the surface of a pigment particle was modified with polyvinyl alcohol. The polyvinyl-alcohol-modified self-dispersible pigment described in Example 10 of Japanese Patent Application Laid-Open No. 2003-519709 was used to adjust the solid content to 20.0%, thereby obtaining a pigment dispersion. Then, an ink of Comparative Example 6 was prepared in a manner similar to that of Example 14, except that the pigment dispersion obtained as described above was used instead of the aqueous dispersion of the pigment 2 used in the ink of Example 14.

Comparative Example 7

Attempts have been made on preparation of an aqueous ink with reference to Example 14 of Japanese Patent Application Laid-Open No. H08-143813. First, an intermediate 1 was synthesized according to Production Example 1 and then subjected to the reaction of Example 1, thereby obtaining a resin (dispersant 1) having a structure in which a polyester side chain was bonded to a polyamine main chain. Then, to prepare a pigment dispersion, 20 parts of carbon black (MA-100, manufactured by Mitsubishi Chemical Co.), 4 parts of the dispersant 1, and an appropriate amount of water were mixed. Then, the mixture was subjected to a dispersion treatment. However, even after the dispersion treatment, the dispersant 1 was not dissolved in water. Thus, the pigment was not able to be dispersed and evaluations as described below were not able to be performed.

Evaluation of Ink

Ejection Stability of Ink

An ink cartridge was filled with each ink obtained as described above and mounted on an ink jet recording apparatus PIXUS iP3100 (manufactured by Canon Inc.), which ejects the ink by the action of thermal energy. In this apparatus, defined as a solid image with a recording duty of 100% is an image recorded under conditions of placing an ink droplet of 5 picoliters on a unit area of 1/1,200 inch×1/1,200 inch with a resolution of 1,200 dpi×1,200 dpi. A 19 cm×26 cm sold image was recorded on 20 sheets of A4 size PPC paper GF-500 (manufactured by Canon Inc.) with a recording duty of 100%. A printed article of the solid image on each of 10th and 20th sheets in this case was visually observed to evaluate the ejection stability of the ink. Evaluation criteria of ejection stability are as follows. The evaluation results are listed in Table 6. In the present invention, the following evaluation criterion "C" was defined as an unacceptable level.

A: No white stripe or blurring was observed even on the 20th sheet.

B: No white stripe or blurring was observed on the 10th sheet but a white stripe or blurring was observed on the 20th sheet.

C: A white stripe or blurring was observed on the 10th sheet.

Abrasion Resistance of Image

The same recording apparatus and recording medium as those used for the evaluation of ink ejection stability were used and a solid image (1 inch×0.5 inch) with a recording duty of 100% was recorded. After 10 minutes and after 1 day from the recording, respective solid images were individually used. A sheet of silbon paper and a weight with a surface pressure of 40 g/cm² were placed on the solid image. Then, the solid image and the silbon paper were rubbed together. After that, the silbon paper and the weight were removed and the transfer of the image to a non-printed portion was visually observed. The evaluation criteria of abrasion resistance are as follows. The evaluation results are listed in Table 6. In the present invention, the following evaluation criterion "C" was defined as an unacceptable level.

A: No soiling was found on the non-printed portion after 10 minutes.

B: An obscure soiling was found on the non-printed portion after 10 minutes, but no soiling was found after 1 day.

C: A significant soiling was found on the non-printed portion after 10 days and also found after 1 day.

TABLE 6

| | | Evaluation results | |
|---|---|---|---|
| | | Ejection stability | Abrasion resistance |
| Example | 14 | A | A |
| | 15 | A | B |
| | 16 | A | A |

TABLE 6-continued

| | | Evaluation results | |
|---|---|---|---|
| | | Ejection stability | Abrasion resistance |
| | 17 | A | A |
| | 18 | B | A |
| | 19 | B | B |
| | 20 | B | B |
| | 21 | A | A |
| | 22 | A | A |
| | 23 | A | A |
| | 24 | A | A |
| | 25 | A | A |
| Comparative Example | 2 | A | C |
| | 3 | — | — |
| | 4 | C | B |
| | 5 | C | B |
| | 6 | C | C |
| | 7 | — | — |

It should be noted that the ejection stability of the ink of Example 21 was a little inferior to the A-ranked inks of other examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-274014, filed Dec. 8, 2010, which is hereby incorporated by reference herein in its entirety.

What is claimed is:

1. A synthesis method for a self-dispersible pigment, the method comprising performing ring-opening addition of a lactone ring of a lactone-based compound to an acidic group that is bonded to a surface of a pigment particle directly or via another atomic group, to bond a functional group, including an ester group, to the surface of the pigment particle.

2. A synthesis method according to claim 1, further comprising performing ring-opening polymerization of the lactone-based compound subsequently to the ring-opening addition of the lactone-based compound.

3. A synthesis method according to claim 1, wherein the functional group is represented by the following general formula (1):

$$-(X)_p-Y-(Z-COO)_nM \qquad \text{General formula (1)}$$

wherein, in the general formula (1), X represents the another atomic group; p represents a number of 0 or 1; Y represents an ester group; Z represents an alkylene group; n represents a number of 1 or more and 20 or less; and M represents a hydrogen atom, an alkali metal, ammonium, or an organic ammonium.

4. A synthesis method according to claim 3, wherein Z in the general formula (1) represents $C_mH_{2m}$, where m represents a number of 2 or more and 5 or less.

5. A synthesis method according to claim 4, wherein m represents 5.

6. A self-dispersible pigment, which is synthesized by the synthesis method according to claim 1.

* * * * *